United States Patent Office 3,115,533
Patented Dec. 24, 1963

3,115,533
PAVING COMPOSITION
Nathan Wiseblood, Malden, Mass., assignor to The Hub Testing Laboratory, Waltham, Mass.
No Drawing. Filed Sept. 30, 1960, Ser. No. 59,491
11 Claims. (Cl. 260—749)

This invention relates to bituminous surfacing and paving compositions and more particularly to asphalt and tar surfacing and paving compositions having new and improved properties.

Despite the commercial success enjoyed by bituminous concrete in competition with Portland cement concrete, the former has been characterized by certain disadvantages.

For one thing, conventional bituminous concrete is substantially heavier than conventional Portland cement concrete. For this reason, conventional bituminous concretes are not preferred over Portland cement concretes where weight is a critical factor. Attempts to reduce the difference in weight to a negligible amount by use of light-weight fillers have not proved successful because both types of concretes can be made with light-weight fillers. Moreover, the resulting bituminous composition has generally been unstable or lacking in strength or unduly susceptible to destruction by water, impact, abrasion, or chemical reaction.

Accordingly, one of the primary objects of the present invention is to produce a new and improved bituminous paving material which is light weight and highly resilient, has high strength and stability, and has high resistance to impact, abrasion, and water.

Another disadvantage of ordinary bituminous concrete is its susceptibility to temperature change. It becomes comparatively soft and viscous at temperatures of 100° F. to 120° F. and above and hard and brittle at temperatures below 50° F. For this reason, a bituminous concrete pavement tends to crack and disintegrate under oxidation and weathering, thereby reducing the span of its useful life. Attempts to reduce this susceptibility have not been fully successful in the past.

Accordingly, another object of the present invention is to reduce the susceptibility of bituminous concrete to temperature change, thereby to extend the span of its useful life.

A further disadvantage of conventional bituminous concretes is their limited use for the manufacture of pavements such as airport runways and taxi strips, gasoline station aprons, and parking lots. The two common bituminous binders used in paving mixtures are asphalt and tar. Of these two materials, asphalt is the first choice for making pavements since it is easier to mix and apply and is more stable. However, asphalt is not resistive to the chemical action of fuel oil, jet oil, and gasoline. Accordingly, most bituminous airport pavements are generally manufactured from tar since it is resistive to fuel oil, jet oil, and gasoline. Unfortunately, tar presents certain problems which complicate manufacture of tar paving mixes in conventional hot mix plants.

In the manufacture of hot asphalt and tar mixes, it is necessary to efficiently and thoroughly dry and screen the mineral aggregates which become part of the paving composition. In a conventional paving mix plant this is accomplished by heating the aggregates to at least 250° F. Unfortunately, tar cannot be mixed with these aggregates while still hot since tar will coke at temperatures above 175–200° F. Coking the tar reduces its strength and its durability. The many failures of airport tar paving are almost directly attributable to the fact that the tar and the embedded mineral aggregates were mixed at too high a temperature, with the result that the tar became coked. While it is possible to avoid charring or coking of the tar by allowing the mineral aggregates to be cooled to a reasonable temperature, as a matter of practice this is difficult to control in view of the fact that in a conventional bituminous mix plant the apparatus and procedures are set for mass production of several standard asphaltic mixtures. Thus, although heating and drying aggregates at a lower temperature is possible, it is always avoided as a matter of convenience as is the alternative of allowing the aggregates to cool before mixing.

Accordingly, another object of the present invention is to provide a bituminous concrete composition which permits hot and cold asphalt and tar mixes to be made at the same time without cooling of mineral aggregates which have been heated for thorough drying and screening, thereby permitting hot and cold asphalt or tar mixes to be made in a common manufacturing plant.

Still a further specific object of the present invention is to provide a bituminous surfacing composition which can be formulated and applied as a hot or cold mix.

Apart from the problem of charring, tar is a difficult binder for the reason that it is not elastic and ductile at cold temperatures or tough and stable at warm temperatures.

Accordingly, another object of the present invention is to provide a tar mix which is suitable for use as a long-life pavement for airports, parking areas, gasoline areas, and the like, said pavement being tough and stable at warm temperatures and ductile and elastic at cold temperatures.

Still another specific object of the present invention is to provide a bituminous composition which can be applied in a relatively thin layer and which can be manufactured in a consistency allowing it to be used as a sealer which can be applied cold.

Other objects, the nature, and many of the attendant advantages of this invention will be readily appreciated as the same becomes better understood by reference to the following detailed description.

The invention hereinafter described is a bituminous paving composition which essentially comprises a mixture of granulated rubber and fine graded cork. This mixture can be made at the time of mixing with the bituminous binder. Alternatively, it may be prepared as a premix and stored in bags or in bins. If prepared as a premix, a light mineral filler like fly ash or diatomaceous earth must be added in order to reduce the danger of spontaneous combustion of the mixture.

Prior to the present invention, rubber in various physical forms has been used with bituminous materials to make a paving material suitable for use on roads, playgrounds, tennis courts, parking lots, and even floors. The main advantage of using rubber is for its flexibility and resiliency. It imparts bounce to a paving. This not only reduces foot and body fatigue and skin abrasions, but also it improves the pavement's resistance to shock or impact. However, rubber has certain undesirable characteristics, and these characteristics have limited the use of paving materials which include rubber as a constituent. Most pavement failures are due to insufficient amount of bituminous binder. Rubber, by itself, does not allow the percentage of bituminous binder in the paving composition to be increased substantially without also increasing during the first few years after construction the danger of bleeding, flushing, and resultant slippery pavements. Another disadvantage of rubber is that it tends to oxidize, and when the oxidation has reached a certain degree, the compatability of the rubber with the asphalt or tar binder diminishes. As the compatibility of rubber and asphalt diminishes, the pavement becomes brittle and hard and loses its resiliency and bounce. The pavement appears "dry" in the same sense as a mix containing too low a percentage of asphalt or tar.

Another disadvantage of rubber is that it will not produce a comparatively light-weight bituminous concrete. Accordingly, I have given attention to other materials which could be incorporated into bituminous paving mixtures in place of rubber to provide a light-weight, flexible end product having substantial springiness. Cork is one such product.

Granulated cork is very light, having a weight of approximately 4 to 12 pounds per cubic foot as compared, for example, to granulated rubber, which runs from approximately 40 to approximately 60 pounds per cubic foot. This makes it desirable for light-weight mixes. Similarly, cork has greater springiness and resiliency than granulated rubber. Because of its greater degree of springiness and resiliency, less skin abrasions, foot blisters, and bodily fatigue will result by the use of cork instead of rubber in a bituminous paving composition. A further advantage of cork over rubber is that it can absorb and be mixed with a greater amount of bituminous binder without danger of bleeding or making a "fat" mix. To be specific, one pound of granulated and graded cork can absorb and be mixed with three to four pounds of liquid asphalt without bleeding or making a "fat" mix, whereas one pound of granulated rubber can satisfactorily accept a maximum of only 0.2 to 0.4 pound of straight asphalt without "fatting" or bleeding of the paving mixture under traffic.

Unfortunately, cork has certain undesirable characteristics which become pronounced when cork is incorporated into a bituminous concrete. Cork is an organic material with particles or fibers which are comparatively weak and which have a resistance to wear and tear that is substantially less than the corresponding resistance of rubber. Additionally, cork is not compatible with asphalt. A bituminous concrete pavement containing only cork is unstable; it will exhibit a great tendency to ravel, abraid, and rot unless treated periodically with expensive seal coats. Moreover, the formulation of bituminous concretes incorporating only cork is not without its problems. It is a difficult matter to mix cork with hot asphalt cement without causing coagulation or "balling" in the mixer. Additionally, cork cannot be heated to the temperature required for hot bituminous mixtures without charring or burning.

Notwithstanding these well-known undesirable characteristics of cork and rubber as individual constituents of bituminous concreate paving mixes, I have discovered that if a bituminous paving mixture is prepared which includes not just rubber alone or cork alone but cork and rubber together in proportions and under conditions hereinafter described, these undesirable characteristics will be substantially eliminated with consequent attainment of the objects noted hereinabove.

As used herein, the term "rubber" includes any synthetic or natural vulcanizable elastomer in vulcanized or unvulcanized form, and in particular members of the class which comprises (1) butadiene rubbers including (a) sodium butadiene rubbers, (b) copolymers of butadiene and styrene (i.e., Buna A), (c) copolymers of butadiene and acrylonitrile (i.e., methyl rubber), (2) isoprene rubbers including neoprene, (3) haloprene rubbers including polybromoprene, (4) copolymers of olefins and small quantities of diolefins, including the copolymer of isobutene and isoprene (i.e., butyl rubber), (5) polysulfide rubbers including the copolymers of sodium tetrasulfide and ethylene dichloride (i.e., Thiokol), and (6) natural rubber.

It is important for the purposes of this invention to classify these natural or synthetic elastomers into two groups: (1) those that will dissolve and amalgamate with cutback oils and the residual oils found in asphalt and tar binders to produce a rubbery, gummy cement and (2) those that are resistant to petroleum and coal oils and aromatic solvents and, therefore, will not dissolve or amalgamate. Of the elastomers which are available commercially in large quantities (and at competitive prices), most fall into the first group. In the second group are the following major types: (a) copolymers of butadiene and acrylonitrile, (b) copolymers of olefins and diolefins, (c) polysulfide rubbers, and (d) neoprene. For the purposes of this invention, it is essential to employ elastomers from both groups. They are introduced into the mix in solid particle form. The rubber which is soluble will coact with the bituminous binder to form a gummy cement which helps prevent the binder when laid as a pavement from becoming hard and brittle at cold temperatures and, by the same token, soft and liquid at warm-to-hot temperatures. The rubber that does not dissolve becomes in effect a supply of elastic aggregates. These aggregates provide great resistance to shock or impact and at the same time help prolong the life of the pavement. The gummy and rubbery cement which results from dissolving of rubber in the bituminous binder oils also coacts with the cork particles in the mix. The rubber cement adheres with great strength to the cork particles, and some of it is absorbed into the pores of the cork, thereby producing a rubberized cork aggregate which is substantially permanently resilient. As a consequence, the cork particles are made substantially compatible with the bituminous liquids and will remain resilient even when the outer or exposed rubber becomes brittle and hard during oxidation. Moreover, the impregnated cork aggregates are effectively and strongly cemented to each other, to adjacent rubber aggregates, and also to the stone or gravel aggregates and any other light mineral fillers present in the paving material, thereby producing high pavement stability during all atmospheric temperature and climatic changes which are normally encountered. A further advantage is that charring, coagulating, or balling of the work particles is eliminated and mixing may be conducted at substantially lower temperatures than has been feasible previously.

As indicated previously, an advantage of the cork particles is that they increase the quantity of bituminous binder which can be tolerated in the paving mix. This is important since it extends the life and durability of the pavement and offsets hardening of the pavement due to oxidation of its bituminous constituents. Heretofore comparable quantities of liquid bituminous binders could not be used for the reason that bleeding, flushing, and undue slipperiness would result during the first few years after construction. Of course, other fillers will also increase the amount of binder which can be used in the mix, but they lack the resiliency and cushioning properties of cork. Nevertheless, it is preferred to include a finely-divided light-weight mineral material such as fly ash, stone dust, diatomaceous earth, Portland cement, or slag dust in paving mixes embodying the present invention. Moreover, as indicated hereinabove, the addition to a rubber-cork premix of a light-weight mineral filler reduces the risk of spontaneous combustion. The light-weight mineral filler also helps protect the comparatively weak cork particles so as to increase their resistance to wear and tear.

In developing and practicing the present invention, it has been found that several criteria must be followed if a paving composition having all of the aforesaid enumerated characteristics is to be obtained.

First of all, it is necessary that a substantial percentage, but not all, of the rubber which is incorporated into the mix be of a composition which will dissolve and amalgamate with the residual or cutback oils of the bituminous binder. At least 30–90 percent (and preferably about 60 percent) of the rubber should be of a type which dissolves and amalgamates.

Secondly, it is necessary that for every part by weight of cork there be used approximately 3.5 to 18 parts by weight of rubber. The preferred ratio is approximately 6.5 to 1.

Thirdly, if the rubber and cork are supplied as a premix, then the premix should also include a fine mineral filler such as fly ash or diatomaceous earth with the rubber, cork, and light mineral filler mixed according to the following formula:

70 to 90 parts by weight of rubber;
5 to 20 parts by weight of cork; and
4 to 10 parts by weight of a non-flammable, light-weight mineral filler.

Fourthly, the total amount of rubber and cork (plus light mineral filler if used) should not be less than approximately 5 percent and should not exceed approximately 45 percent by weight of the final paving composition, depending upon the proposed use of the composition.

Various forms of rubber may be employed in the practice of the present invention. Scrap rubber is preferred. An excellent source of scrap rubber is old automobile and truck tires. These are ground up with no attempt made to remove the cord except perhaps where the composition is to be made in a relatively fluid consistency so as to be useable as a thin top coat for sealing purposes. The nylon or rayon cord in scrap tires does not hinder the present invention. On the other hand, it does not seem to be responsible for the improved results attained with the present invention. Of course, it is not necessary that the rubber be scrap. New rubebr, natural or synthetic, may also be used, although economics make it impractical to use new rubber. Similarly, although vulcanized rubber is readily available for the present invention, unvulcanized rubber may also be used. However, regardless of its chemical nature, the rubber will be in particle or aggregate form when used in the present invention. Grinding up soluble rubber into small particles facilitates formation of the aforementioned rubbery cement, while grinding up insoluble rubber provides a mass of aggregates which can be homogeneously and uniformly distributed in the paving mix.

The size of the cork and rubber particles varies, depending upon the type of paving composition to be made. Thus, for example, for a paving composition suitable as a bottom course for a highway, the sizes will be substantially larger than is the case for compositions to be used as a top course for a highway or as the top surface of a playground, running track, or tennis court. Similarly, the gradation anlysis of the cork and rubber will be much finer where the composition is to be used as a top sealing composition suitable for application over existing pavements. For a bottom course, it is preferred that the cork-rubber particles shall have a maximum size of about ½ inch. For top courses, the maximum size of the cork-rubber particles should be ¼–⅜ inch. For seal coats, the cork-rubber particles shall all pass through a #20 standard sieve.

A suitable gradation analysis for the rubber and cork in a paving composition is as follows:

GRADATION ANALYSIS A

| U.S. Standard Sieves Passing— | Bottom Course, Percent by Weight | | Top Course, Percent by Weight | |
|---|---|---|---|---|
| | Min. | Max. | Min. | Max. |
| 3/8" | 100 | | 100 | |
| #4 | 75 | 100 | 100 | |
| #8 | 35 | 80 | 90 | 100 |
| #16 | 25 | 50 | 50 | 80 |
| #40 | 0 | 30 | 0 | 50 |

A suitable rubber-cork gradation analysis for a top seal coat or for a colored pavement is as follows:

GRADATION ANALYSIS B

| U.S. Standard Sieves Passing— | Percent by Weight | |
|---|---|---|
| | Min. | Max. |
| #20 | 100 | |
| #40 | 70 | 100 |
| #200 | 25 | 60 |

The light mineral filler, preferably fly ash or diatomaceous earth, will have a particle size smaller than the rubber and cork, generally small enough to pass through a 200 mesh sieve.

The mineral aggregates, e.g., gravel, stone, slag, and commercial light-weight mineral aggregates, used in the paving mix for body, strength, wear, and reduction in cost shall conform to standard requirements. A typical gradation analysis for mineral aggregates is as follows:

GRADATION ANALYSIS C

| U.S. Standard Sieves Passing— | Bottom Course, Percent by Weight | | Top Course, Percent by Weight | |
|---|---|---|---|---|
| | Min. | Max. | Min. | Max. |
| 1/2" | | | | |
| 3/8" | 100 | | | |
| #4 | 75 | 100 | 100 | |
| #8 | 50 | 80 | 95 | 100 |
| #16 | 35 | 60 | 65 | 90 |
| #40 | 20 | 40 | 30 | 50 |
| #80 | 5 | 20 | 10 | 30 |
| #200 | 1 | 5 | 2 | 8 |

For seal coats, the mineral aggregates shall be of smaller size, preferably all passing through a #4 or a #8 standard sieve. In general, the average specific gravity of mineral aggregates used in paving compositions will be in the range of 1.5 to 3.0.

The bituminous cementitious component of compositions formed according to the present invention will be a bitumen of the class consisting of asphalt and tar. If asphalt, it may be in the form of emulsified asphalt, cutback asphalt, natural asphalt, or powdered asphalt with an oil solvent such as kerosene or fuel oil. The tar component may be in liquid form due to the heating or may be extended and rendered more fluid by the addition of volatile light tar oils containing benzine, naphthaline, toluene, and other hydrocarbon oils that will also dissolve some of the rubber. In general, the tar or asphalt will have an adjusted specific gravity falling within the range of 0.8 to 1.4. It is contemplated further that the bituminous binder may comprise a mixture of asphalt and tar.

In the practice of this invention, the various components may be varied within the following limits according to the nature of the product desired and the contemplated use.

Materials                                        Percent by weight
  Cork-rubber or cork-rubber mineral filler ___  5–45
  Mineral aggregates _____  23–84
  Bituminous binder and solvents _____  11–35

By way of definition as applied to bitumens, the term "solvent" is intended to embrace residual oils found in asphalt and tar binders as well as solvents added to the binders.

Within the foregoing limits, it is possible to produce both hot and cold tar mixes without charring in a plant where hot and cold asphalt mixes are being made, notwithstanding the fact that the screen mineral aggregates are at a temperature of at least 250° F. when added to the mix. For the purposes of this invention, cold mixes are defined as mixes having a temperature of 115° F., or less.

The problem of charring of tar is eliminated by the rubber and cork, and also the light mineral fillers when used. The rubber, cork, and light mineral fillers are not heated prior to use. Therefore, they will rapidly absorb heat from the mineral aggregates, reducing the temperature of the mix. Because the volume per unit weight of the cork and rubber is substantially greater than that of the mineral aggregates, they have a marked capacity to absorb heat from the aggregates. In this connection it is to be noted that volume ratios per unit weight of rubber-cork to mineral aggregates is about 6.5 to 1. Thus, for example, in a mix comprising approximately 12 percent cork, rubber, and mineral fillers and 70 percent mineral aggregates, the volume of the latter will be about equal to the former. Since there are approximately equal volumes, the resulting temperature will be approximately one-half of the temperature differential between these two groups of materials. Therefore, notwithstanding the fact that the aggregates have been heated to a temperature of 250° F., the tar will not be charred when the mineral aggregates and the cork, rubber, and mineral filler are added. The latter components will absorb sufficient heat from the heavy aggregates to reduce them to a temperature too low to char, i.e., lower than 200° F.

The following table illustrates how hot and cold tar mixes free of charring will result under the present invention despite the fact that the mineral aggregates are at a temperature of 300° F. when added to the mix. In this table the cork-rubber-fly ash premix comprises 80 percent scrap rubber, 16 percent cork, and 4 percent fly ash. The scrap rubber comprises about 75 percent soluble butadiene-styrene rubber and about 25 percent butyl rubber. The solvent is toluene; the tar is a standard paving tar.

TABLE I

| Percent of Cork-rubber Agg. at 70° F. | Percent Mineral Aggregate at 300° F. | Percent of Tar Rubber Solvent at 70° F. | Percent of Tar at 200° F. | Resulting Temperature of Mix at °F. |
|---|---|---|---|---|
| 8 | 74.3 | 0.7 | 17.0 | 180 to 200 |
| 10 | 70.0 | 0.9 | 19.1 | 170 to 190 |
| 12 | 66.0 | 1.1 | 20.9 | 160 to 180 |
| 16 | 57.4 | 1.6 | 24.0 | 140 to 155 |
| 18 | 54.6 | 2.0 | 25.4 | 130 to 145 |
| 20 | 50.8 | 2.4 | 26.8 | 125 to 135 |
| 22 | 47.1 | 2.9 | 28.0 | 120 to 135 |
| 24 | 43.6 | 3.4 | 29.0 | 115 to 130 |
| 26 | 40.2 | 4.0 | 29.8 | 110 to 125 |
| 28 | 36.7 | 4.7 | 30.6 | 105 to 120 |
| 30 | 33.4 | 5.3 | 31.3 | 105 to 120 |

The following table illustrates how hot and cold asphalt paving mixes can be made under the present invention using asphalt at an initial temperature of 300° F. The cork-rubber mixture includes fly ash and is of the same composition as the mixture described in connection with Table I.

TABLE II

| Percent Rubber Cork Agg. at 70° F. | Percent Mineral Aggregates at 350° F. | Percent Mineral Oils at 70° F. | Percent 85–100 Penetration Asphalt-Cement at 300° F. | Resulting Mix Temp., °F. | Resulting Penetration of Asphalt |
|---|---|---|---|---|---|
| 4 | 84.2 | 0.8 | 11.0 | 285–300 | 140–180 |
| 6 | 81.8 | 1.2 | 11.0 | 275–290 | 150–200 |
| 8 | 77.0 | 1.5 | 13.5 | 250–270 | 170–220 |
| 10 | 72.2 | 1.8 | 16.0 | 225–250 | 180–230 |
| 12 | 67.9 | 2.1 | 18.0 | 210–225 | 190–240 |
| 14 | 64.2 | 2.3 | 19.5 | 195–210 | 200–250 |
| 16 | 60.8 | 2.5 | 20.7 | 180–195 | 210–260 |
| 18 | 57.5 | 2.7 | 21.8 | 165–180 | 220–280 |
| 20 | 54.3 | 2.9 | 22.8 | 150–165 | 230–300 |
| 22 | 51.0 | 3.3 | 23.7 | 135–150 | 230–300 |
| 24 | 47.3 | 4.2 | 24.5 | 125–140 | 230–300 |
| 26 | 43.7 | 5.2 | 25.1 | 120–135 | 230–300 |
| 28 | 40.1 | 6.3 | 25.6 | 115–130 | 230–300 |
| 30 | 36.6 | 7.4 | 26.0 | 110–123 | 230–300 |
| 32 | 33.2 | 8.5 | 26.3 | 105–120 | 230–300 |
| 34 | 29.8 | 9.7 | 26.5 | 105–120 | 230–300 |
| 36 | 26.3 | 10.9 | 26.8 | 105–120 | 230–300 |
| 38 | 22.8 | 12.2 | 27.0 | 100–120 | 230–300 |

With respect to the foregoing table, the resultant mixes may be classified as hot, semi-hot, and cold. Hot mixes are those above 210° F. Semi-hot mixes are those from 210° F. down to about 115° F. The rest are cold mixes.

Following are examples of how to manufacture asphalt and tar mixes embodying the present invention. In these examples, the cork and rubber have a particle size conforming to gradation analysis A foregoing; the mineral aggregates correspond in size to gradation analysis C. The rubber is the same in both cases, comprising about 80 percent scrap butadiene-styrene rubber and 20 percent scrap polysulfide rubber.

*Example I*

An asphalt paving mixture is prepared having proportions according to the following formula.

Material: Percent by weight
    Rubber-cork _____ 10
    Mineral aggregates (gravel and crushed stone)__ 72
    Asphalt (85–120 penetration)_____ 16
    Kerosene _____ 1.8
    Naphtha _____ .2

The cork and rubber are added separately and not as a premix. The ratio of rubber to cork is 82 percent to 18 percent. The rubber, cork, kerosene, and naphtha were all at a temperature of 70° F. prior to use in the mixture. The asphalt is preheated to a temperature of about 350° F.

The order of mixing is as follows: First the rubber and cork are added to the hot aggregates and mixed for about twenty (20) seconds. Then the hot asphalt, kerosene, and naphtha are added simultaneously without stopping agitation of the mixture. The agitation is continued until all particles are uniformly distributed and coated. It is to be noted that in the usual case agitation for ½–2 minutes is sufficient to assure a uniform paving mixture. In this case, the resulting temperature of the mix after ½–2 minutes of mixing will be approximately 230° F. The resulting penetration value will be approximately 210.

*Example II*

A tar paving mixture is prepared according to the following formula by weight.

Material: Percent
    Rubber-cork-fly ash _____ 24
    Mineral aggregates (gravel and stone)_____ 43
    Coke oven tar (T–12)_____ 29
    Toluene _____ 4

The rubber, cork, and fly ash are provided as a premix formulated according to the ratio of 20:4:1 respectively. The rubber and cork particle sizes are as in gradation analysis A above. The sizes of the mineral aggregates are according to gradation analysis C above. The starting temperatures are as follows: rubber-cork-fly ash, 70° F.; mineral aggregates, 325° F.; tar, 200° F.; and toluene 70° F.

The rubber-cork-fly ash premix is added first to the aggregates while the latter are being agitated at a steady rate. About 20 seconds later, the tar and toluene are added simultaneously. Mixing is continued for about ½-2 minutes more, after which the resultant mixture is discharged for use. The temperature of the mixture within two minutes after addition of the tar is about 115° F., making it a cold mix as defined hereinabove.

Coke oven tar mixes formulated as above are tough and stable at warm temperatures and ductile and elastic at cold temperatures. Moreover, such tar mixes are resistant to fuel oil, jet oil, and gasoline, thereby making excellent pavements for airports, parking areas, gasolene stations, and the like.

In practice, it has been found that for asphalt bottom mixes the best results are obtained when the proportions are as follows.

| Materials | Percent by Weight | |
|---|---|---|
| | Min. | Max. |
| Cork-Rubber or Cork-Rubber-Mineral Filler | 6 | 10 |
| Mineral Aggregates | 75 | 82 |
| Asphalt and Solvents | 12 | 15 |

The delivery temperature should be 220–280° F.

For asphalt top mixes especially suitable for tennis courts, playgrounds, and running tracks, the best results are obtained when the proportions are as follows:

| Materials | Percent by Weight | |
|---|---|---|
| | Min. | Max. |
| Rubber-Cork (or rubber-cork filler) | 10 | 16 |
| Mineral Aggregate | 60 | 72 |
| Asphalt | 16 | 21 |
| Asphalt-Rubber Solvent | 1.8 | 2.5 |

It is to be noted that under this invention light-weight bituminous concrete mixtures can be made which weigh less than half conventional bituminous concretes. Conventional bituminous concrete pavements, i.e., pavements made from asphalt or tar, sand, gravel, and/or crushed stone, average about 150 pounds per cubic foot at maximum compaction. Utilizing the present invention, it is possible to provide bituminous concretes that weigh only about 50 pounds.

The following table compares the various weights per cubic foot at maximum compaction with total percentages of rubber-cork-fly ash aggregates and particles in the mix. The results of the following table are for asphalt mixes formulated according to Table II.

TABLE III

Percent cork-rubber:
```
 4 _____ 120 to 130
 6 _____ 110 to 125
 8 _____ 105 to 115
10 _____ 100 to 110
12 _____  95 to 105
14 _____  90 to 100
16 _____  86 to 96
18 _____  82 to 92
20 _____  78 to 88
22 _____  74 to 84
24 _____  70 to 80
26 _____  66 to 76
28 _____  63 to 73
30 _____  60 to 70
32 _____  57 to 67
34 _____  55 to 65
36 _____  52 to 63
38 _____  51 to 61
40 _____  50 to 60
```

The following characteristics of rubber-cork-asphalt cements prepared as in Example I have been determined from extensive tests:

(1) The penetration is approximately one-half the penetration of standard asphalt at 77° F.

(2) Whereas most standard asphalt cements are too soft for penetration at 110° F., the rubber-cork-asphalt cement shows at 110° F. penetrations that are normally found at 77° F.

(3) At 39.5° F., the new cement has a penetration one and one-half to two times greater than standard asphalt cements.

(4) The new asphalt cement has 3–5 times the ductility of regular asphalt cements at 39.5° F.

(5) The melting point is approximately 30° F. greater than regular asphalt cements.

(6) The stability is 4–10 times greater than regular asphalt cements as determined by the standard flow test.

(7) Whereas standard asphalt concretes have comparatively no tensile or compressive elasticity, and show no appreciable rebound after impact or loading, cork-rubber-asphalt concretes are stable, elastic, and have appreciable give and rebound under load and impact at temperatures as low as 10° F. and as high as 140° F.

(8) The coefficient of friction of pavements made with cork-rubber-asphalt concrete is approximately two times greater than of pavements made with standard asphalt concrete; moreover, the angle of friction is as much as one and one-half times greater.

(9) Resistance to shock is 5 to 10 times greater with cork-rubber-asphalt concretes, as determined by standard drop tests.

(10) Because of the high percentages of bituminous binder, i.e., asphalt, and hydrocarbon oils that can be tolerated under the present invention, plus the relatively small sizes of the rubber and cork particles, it is comparatively simple to place cork-rubber-asphalt mixes in compacted thickness of one-quarter to one-half inch.

(11) Cork-rubber-asphalt mixes do not need traffic to stay "alive." Hence, they are ideal for areas such as median strips, sidewalks, roofs, etc., which may carry relatively little traffic.

Rubber-cork-tar concretes prepared as suggested in Example II have improved characteristics comparable to those outlined above for rubber-cork-asphalt mixes.

It is to be understood that the examples and many of the terms and expressions which appear in the foregoing specification are employed primarily for the purpose of description of the invention. Accordingly, it is contemplated that within the scope of the appended claims, various modifications, variations, extensions, and substitutions may be made without departing from the principles of the invention as described.

I claim:

1. A paving composition comprising cork particles, mineral aggregates, a bituminous binder comprising a bitumen from the class consisting of tar and asphalt, and rubber, approximately 30% to 90% by weight of said rubber disposed as a coating on said particles and mineral aggregates, the rest of said rubber being in particle form, the ratio by weight of rubber to cork being in the range of 18 to 1 down to 3.5 to 1, and the rubber and cork together totaling less than 45% of the total weight of said composition.

2. A paving composition comprising cork particles, ground-up rubber tires, mineral aggregates, and a bituminous binder comprising a bitumen from the class consisting of asphalt and tar and a solvent for said bitumen, 30% to 90% by weight of the rubber content of said ground-up rubber tires being soluble in said solvent, the remainder of said rubber content being insoluble in said solvent, said cork and ground-up rubber tires totalling less than 45% by weight of said composition with the ratio of said ground-up rubber tires to cork being in the range from 18 to 1 down to 3.5 to 1.

3. A paving composition comprising rubber particles, cork, mineral aggregates, and a bituminous binder comprising a bitumen from the class consisting of asphalt and tar and a solvent for said bitumen, said rubber and cork totalling less than approximately 45% by weight of said composition with the ratio by weight of said rubber particles to cork being in the range from 18 to 1 down to 3.5 to 1, said rubber being from the group consisting of polybutadiene rubbers, polyisoprene rubbers, polyhaloprene rubbers, polysulfide rubbers, natural rubbers, and copolymers of an olefin and a diolefin, with 30–90% by weight of said rubber particles being soluble in said solvent and the remainder being insoluble in said solvent.

4. A paving composition comprising cork, rubber, mineral aggregates, and a bituminous binder comprising a bitumen from the class consisting of tar and asphalt and a solvent for said bitumen, approximately 30% to 90% of said rubber being dissolved in said solvent and the remainder of said rubber being in particle form, said cork and rubber totalling less than approximately 45% by weight of said composition with the weight ratio of rubber to cork being in the range from approximately 18 to 1 down to approximately 3.5 to 1.

5. A paving composition as defined by claim 4 wherein the bitumen is tar.

6. A paving composition as defined by claim 4 wherein the bitumen is asphalt.

7. A paving composition as defined by claim 4 wherein the solvent is a member of the class consisting of kerosene, naphtha, toluene, benzene, naphthalene, and fuel oil.

8. A composition as defined by claim 4 wherein the mineral aggregate comprises gravel.

9. A composition as defined by claim 4 wherein the mineral aggregate comprises gravel and a light-weight mineral filler, the ratio of rubber to cork and filler being 70–90 rubber to 5–20 cork and 4–10 light-weight mineral filler.

10. A composition as defined by claim 9 wherein the light-weight mineral filler is a member of the class consisting of fly ash and diatomaceous earth.

11. A paving composition comprising cork particles, rubber aggregates, mineral aggregates, and a bituminous binder comprising a bitumen from the class consisting of tar and asphalt and a solvent for said bitumen, approximately 30% to 90% of said rubber being soluble in said solvent and the remainder being insoluble in said solvent, said cork and rubber totalling less than approximately 45% by weight of said composition with the weight ratio of rubber to cork being in the range from approximately 18 to 1 down to approximately 3.5 to 1.

References Cited in the file of this patent

UNITED STATES PATENTS

| | | |
|---|---|---|
| 2,563,115 | Huggins | Aug. 7, 1951 |
| 2,700,655 | Endres et al. | Jan. 25, 1955 |